Aug. 28, 1951          H. P. JONES          2,565,967
CORN POPPER
Filed Jan. 7, 1946          2 Sheets-Sheet 1
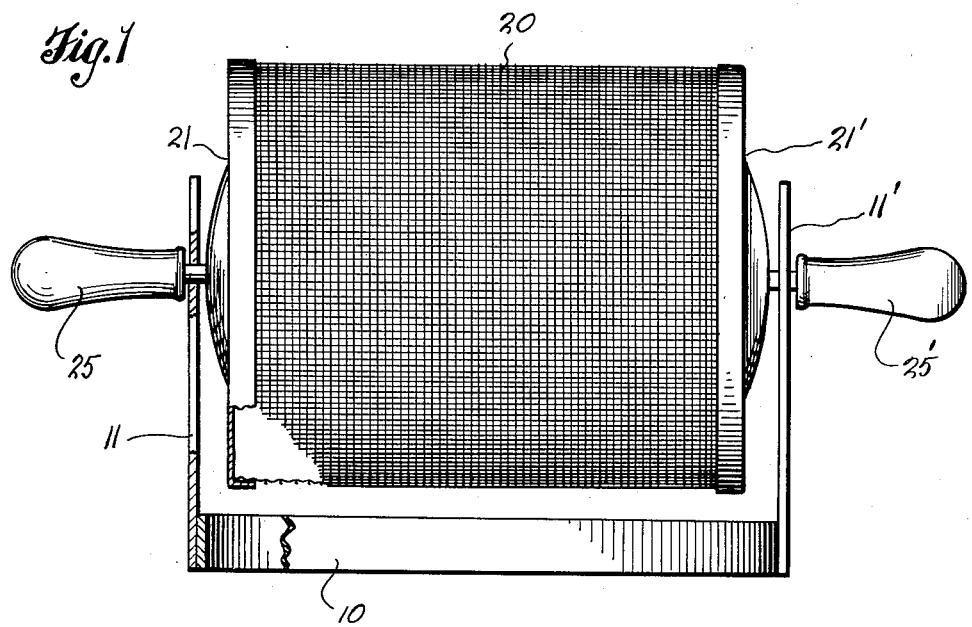
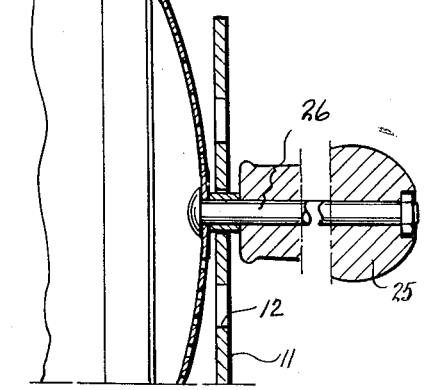
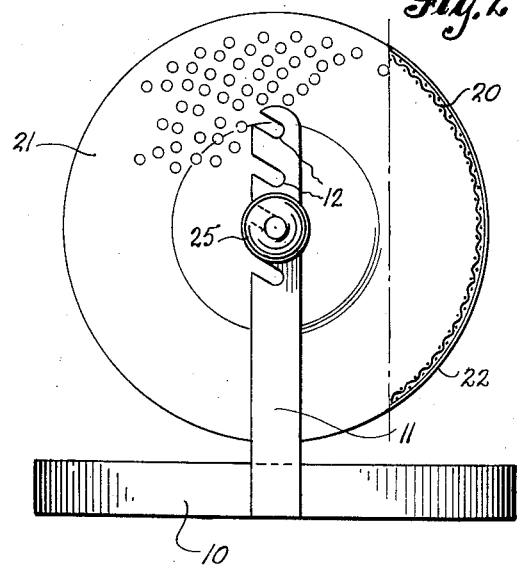
INVENTOR
HARMON P. JONES
BY
Cook & Robinson
ATTORNEYS

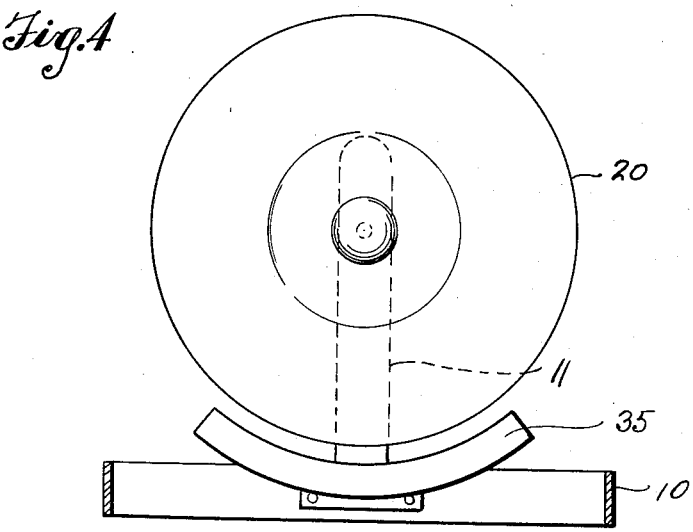
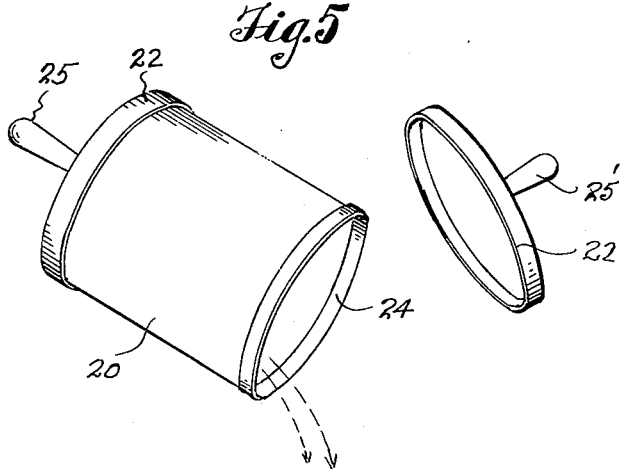

Patented Aug. 28, 1951

2,565,967

UNITED STATES PATENT OFFICE 2,565,967

CORN POPPER

Harmon P. Jones, Seattle, Wash.

Application January 7, 1946, Serial No. 639,561

1 Claim. (Cl. 99—238.1)

This invention relates to corn poppers, and it has reference more particularly to a corn popper comprising a frame, or stand, that is adapted to be placed upon the top of a stove or over a heating element or a burner, and a cage-like retainer or housing principally of screen wall construction, that is designed to be supported for agitation by the stand while corn is being popped therein, and to be removed and opened for the pouring out of the popped corn; it being the principal object of this invention to provide such a corn popper having substantial capacity; that may be easily handled; that need not be supported in the hand while the corn popping operation is taking place, and may be easily agitated.

It is also an object of this invention to provide a corn popper of the kind above stated wherein provision is made in the stand portion thereof for supporting the popper housing at various distances from the source of heat and from which stand, the container may be readily lifted for emptying the popped corn therefrom.

Another object of this invention is to provide a popper housing that is of cylindrical form and equipped with end walls having trunnions attached thereto whereby it may be supported, while agitated or rotated, and also serving as mountings for handles whereby it may be lifted from the stand and handled while being emptied.

Further objects of the invention are to be found in details of construction of parts, in their combination and in the mode of use of the device as will hereinafter be fully described.

In accomplishing these and other objects of the invention, I have provided the improved details of construction, the preferred forms of which are illustrated in the accompanying drawings, wherein—

Fig. 1 is a side view of a corn popper constructed in accordance with the present invention, parts thereof at one end being broken away for better understanding of construction.

Fig. 2 is an end view of the same; a part of the housing being shown in section for better illustration.

Fig. 3 is an enlarged sectional detail of construction of parts, at the opening end of the housing.

Fig. 4 is a cross sectional view illustrating the application of an electrical heating element to the device.

Fig. 5 is a perspective view illustrating the manner of opening the housing for emptying popped corn therefrom.

Referring more in detail to the drawings—

In a preferred form of construction, the present corn popping device comprises that part referred to as the supporting frame, and that part referred to as the popper housing. The supporting frame comprises a horizontal base member 10 which is here shown as being of circular form or substantially so, and made of a metal that is adapted to withstand that heat to which it may be subjected in use. Fixed to this base member 10 at diametrically opposite sides thereof, are vertical standards 11 and 11', each of which is formed along one vertical edge with a succession of laterally and upwardly opening notches 12, forming seats for receiving the housing supporting trunnions therein, as presently will be explained.

The base member 10, in a popper of a practical size for home use, would be about nine inches in diameter, and the standards thereon should be from six to nine inches high, with the notches 12 formed along the upper end portions thereof approximately one inch apart. These dimensions, however, might be varied as desired or as required to meet any special condition or requirement, without departing from the spirit of the invention. Furthermore, the base member might be square, rectangular or of other shape, so long as it effectively served its supporting function and did not interfere with the heating element.

The corn container, or what has been referred to as the popper housing, is designated by reference numeral 20, and it is of cylindrical form, or may be of barrel form, and is made from a piece of screen wire of suitable mesh to retain the corn to be popped. The ends of the cylinder are closed by perforated metal disks 21—21' formed at their peripheral edges with flanges 22, within which the opposite end portions of the screen are fitted.

One end of the screen housing 20, as has been indicated at the left hand side in Fig. 1, is secured within the flange of the end plate or wall 21 by spot welding or otherwise, while the opposite end is equipped with a smooth metal bending strip 24 folded thereover, as best shown in Fig. 3. This end may be slipped into and from the flange of the end plate at the right hand end in a joint that is sufficiently friction tight to hold the end in place and support the housing in position for the corn popping operation but permitting the end to be pulled off for emptying the housing and for recharging it, as has been illustrated in Fig. 5.

Fixed centrally to the end disks or plates 21—21' are handles 25—25. Each handle, which must be of wood or other suitable material, is mounted by a bolt 26 that has its inner end riveted or otherwise permanently and rigidly fixed to the end disk as seen in Fig. 3. There is also some clearance between the inner end of the wooden handle and end disk, permitting these parts of the bolts to be seated in notches 12 of the supports 11—11' for the support of the housing.

In use of the device, the supporting frame is placed upon the top of a stove or range, with the base member 10 located about a heating element, or around a gas burner. Then the popper housing is disposed in the frame at a suitable elevation above the burner and the trunnion portions of the handle mounting bolts disposed in selected seats 12 of the standards. Then, if it is desired to agitate the popper while the corn is being popped, the operator may grasp one or the other of the handles and, through it, oscillate the housing. When the corn is popped, the housing may be lifted out of the stand, the end wall 21' pulled off and the popped corn poured out of the housing.

In Fig. 4, I have illustrated, as an alternative, the application of an electrical heating element 35 to the supporting stand. In such device, the element would be mounted between the standards 11—11' and supported therefrom at a suitable interval below the popper housing. Preferably the element would be curved to conform to the curvature of the cylindrical housing as shown.

Devices of the character described may be made in various sizes and of various materials. They may be used on coal or wood stoves or on present-day electrical or gas ranges. Dimensions and materials may be varied as may be found desirable.

Because of its lightness in weight, its simplicity of construction, its portability and its effectiveness in use, the present popper is especially desirable for domestic use, but may be used to advantage also for large scale corn popping.

Having thus described my invention, what I claim as new therein and desire to secure by Letters Patent is:

A corn popper comprising an annular base member adapted to be disposed on a supporting surface to encircle heating element and equipped at opposite sides with standards, each being formed with a succession of laterally and upwardly opening notches, a cylindrical drum of wire mesh disposed horizontally between the standards, closure members of disk-like form applied to the ends of the drum, each having an outwardly dished central portion and central trunnion extending outwardly therefrom; said trunnions being removably seated in corresponding notches of the standards to support the drum for rotation and handles fixed to and extended outwardly from the trunnions; one of said closure members being removable from the drum when the drum is removed from its supports, and said drum end closures being contained closely between the standards to retain them against removal from the drum while it is between the standards.

HARMON P. JONES.

REFERENCES CITED

The following references are of record in the file of this patent:

UNITED STATES PATENTS

| Number | Name | Date |
|---|---|---|
| 136,980 | Dyke | Mar. 18, 1873 |
| 362,483 | Battis | May 10, 1887 |
| 534,255 | Fleming | Feb. 19, 1895 |
| 771,638 | Hornby | Oct. 4, 1904 |
| 888,081 | Grigg | May 19, 1908 |
| 1,134,343 | Mago | Apr. 6, 1915 |
| 1,212,051 | Gumaer | Jan. 9, 1917 |
| 1,307,078 | Bogue | June 17, 1919 |
| 1,460,248 | Kott | June 26, 1923 |
| 2,194,852 | Gundelfinger et al. | Mar. 26, 1940 |

FOREIGN PATENTS

| Number | Country | Date |
|---|---|---|
| 87,703 | Germany | July 24, 1894 |